United States Patent [19]

Pahr

[11] Patent Number: 5,379,165

[45] Date of Patent: Jan. 3, 1995

[54] METHOD AND APPARATUS FOR IMPROVING THE ACCURACY OF A TAPE SERVO TRACK SEEK ALGORITHM BY USING LONGITUDINALLY CORRELATED WAVEFORMS OF LATERAL TAPE MOVEMENT UNIQUE TO EACH TAPE CASSETTE

[75] Inventor: Per O. Pahr, Lier, Norway

[73] Assignee: Tandberg Data A/S, Oslo, Norway

[21] Appl. No.: 34,573

[22] Filed: Mar. 19, 1993

[51] Int. Cl.⁶ .................................................. G11B 5/55
[52] U.S. Cl. .............................. 360/78.02; 360/77.12;
                                                      324/207.22
[58] Field of Search ............... 360/77.12, 78.01, 78.02,
                                      360/77.01, 75; 324/207.22, 212

[56] References Cited

U.S. PATENT DOCUMENTS

| | | | |
|---|---|---|---|
| 4,472,750 | 9/1984 | Klumpp et al. | 360/78.02 X |
| 4,639,796 | 1/1987 | Solhjell | 360/77.12 |
| 4,677,505 | 6/1987 | Nukada et al. | 360/77.12 |
| 5,050,017 | 9/1991 | Carr et al. | 360/77.12 |
| 5,196,969 | 3/1993 | Iwamatsu et al. | 360/78.02 X |

Primary Examiner—Aristotelis Psitos
Assistant Examiner—James L. Habermehl
Attorney, Agent, or Firm—Hill, Steadman & Simpson

[57] ABSTRACT

A method and apparatus for positioning a magnetic servo head relative to a servo track on a traveling magnetic tape both make use of the observation that a given tape in a given tape drive unit exhibits transverse tape movements during operation which constitute a "signature" waveform for the coupled tape cartridge and drive unit. In the method and apparatus, the transverse movements of a traveling tape in a drive unit are monitored to obtain the aforementioned waveform which is characteristic of the transverse movements for that tape, and the waveform is stored. The positioning of the servo head is controlled relative to a servo track on the tape using a control signal generated according to any known track seek algorithm. The stored waveform is recalled and is superimposed on the control signal, thereby significantly increasing the accuracy of the positioning of the servo head, which in turn increases the accuracy of positioning of the write/read head.

10 Claims, 4 Drawing Sheets

METHOD AND APPARATUS FOR IMPROVING THE ACCURACY OF A TAPE SERVO TRACK SEEK ALGORITHM BY USING LONGITUDINALLY CORRELATED WAVEFORMS OF LATERAL TAPE MOVEMENT UNIQUE TO EACH TAPE CASSETTE

BACKGROUND OF THE INVENTION

1. Field of the Invention

The present invention is directed to a method and apparatus for improving the accuracy of a conventional tape servo track seek algorithm, of the type used to position a write/read head relative to a magnetic tape on which data and servo tracks are present in a high density format.

2. Description of the Prior Art

It is well known that imperfections in the rotating parts of a tape cartridge, such as the capstan wheel and the rotor of the motor, cause characteristic frequencies which can be observed in the tape transversal movements. At a given tape speed and a given length of tape wound on the cartridge hubs, each rotating part has its own characteristic frequency. This causes both longitudinal and transversal vibrations of the tape. These dynamic transversal tape movements have heretofore been characterized in the frequency domain with the aid of spectrum analyzers or by taking the Fast Fourier Transform of time-domain waveforms captured on digital storage oscilloscopes. It is also well known that certain abrupt transversal displacements of the tapes position in the tape guides can take place. This last type of tape displacement is not directly caused by or related to the characteristic frequencies of the rotating parts. This is an essential point of observation for the invention. However, it is not unreasonable to believe that cartridge vibration or external forces (e.g., gravity forces on the heavy tape hubs or external mechanical noise) can trigger these abrupt displacements. The abrupt changes can take place simply because there is room for them to occur. Due to mechanical tolerances of tape guides and tape widths, the tape can not be kept in an absolute position with respect to one side of the tape guide. The worst-case "gap" between the widest guide and the narrowest tape for the quarter-inch cartridges in use today is 46 $\mu$m. If an abrupt, change take place randomly, the tape will still be subject to exactly the same vibrations stemming from the rotating parts.

For tapes with data and servo tracks thereon in a high density format, it is critical to be able to accurately position the write/read head relative to a selected track. This is accomplished using a servo head and track seek algorithm, of which many are known. All such algorithms depend for their accuracy on the tape itself being located, and remaining, at an "expected" position in a direction perpendicular (transverse) to the direction of tape travel. The aforementioned transverse tape movements thus degrade, or limit, the accuracy of known track seek algorithms since the servo is normally not locked in during the servo track seek.

SUMMARY OF THE INVENTION

The invention disclosed herein is based on a physical observation which followed from an experiment initiated by the inventor. The starting point is to observe the vibrations in the time domain and not in the frequency domain as has been conventionally done in the prior art. One can do the following experiment. The tape transversal movements are observed from a stationary position (i.e., at the magnetic recording head), for example by using an optical tape edge detector with an analog output signal proportional to the light falling on it so that the transversal tape movements modulate the amount of light falling on the detector. Further, one makes a small cut or a hole (a mark) in the edge of the tape so that when this mark is located in front of the detector, a marker will occur in the analog signal. A digital storage oscilloscope is further set to a trigger threshold of a certain magnitude which causes the oscilloscope to start its recording in time when this marker occur. The tape is started from a position prior to this mark so that it will reach its stationary, servo-controlled tape speed before the mark occurs. When the marker triggers the oscilloscope, the signal proportional to the transverse tape movements or vibrations is stored in memory for a certain length of tape and time, related to each other by the constant speed of the tape. The tape is then stopped and rewound to its starting position and the same procedure is repeated by triggering the oscilloscope at exactly the same longitudinal tape position as before and stopping the recording at exactly the same time and tape position as before. This procedure can be repeated many times and the stored time domain waveforms can be compared with each other; i.e., one can perform a correlation between the waveforms.

Figure 1:
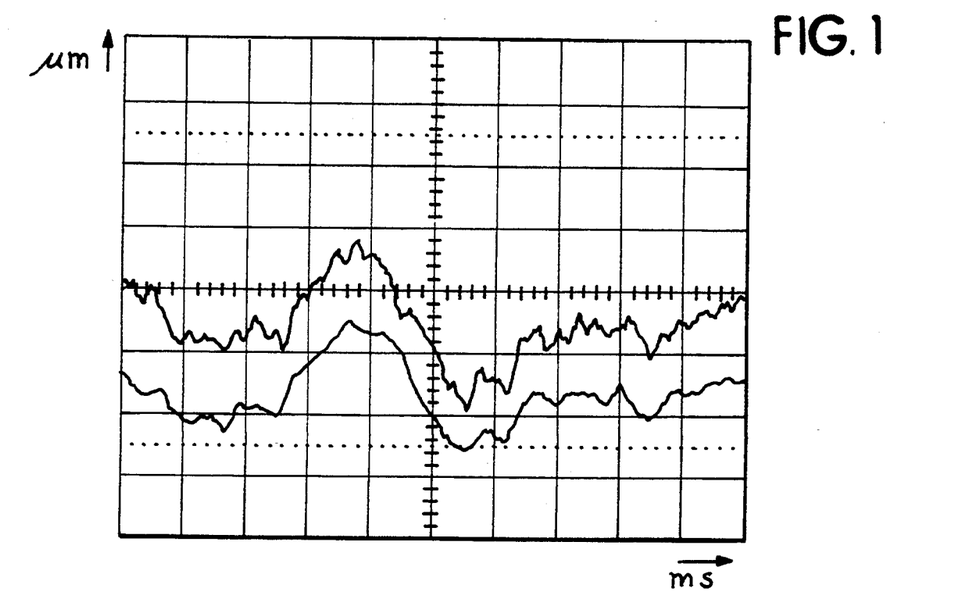
FIGS. 1, 2 and 3 show experimental results verifying the observation that, for a given tape coupling the components of a given drive, the transversal movements of the tape exhibit a characteristic waveform.

FIG. 1 shows the results of such an experiment obtained with a $\frac{1}{4}$ inch tape cartridge for $5\frac{1}{4}$ inch form factor tape streamers when the tape is running at 120 ips. The upper graph is the first waveform recorded in the experiment and the lower graph represents the average of 1000 waveforms. The time scale is 10 ms/div. and the vertical scale is 8 micrometer/div. The graphs in FIG. 1 have not been artificially displaced vertically. One can draw two very important conclusions from these waveforms. The first is that one can see clearly and without the aid of any mathematical processing see the very strong correlation in the signals. If the correlation had been zero between individual graphs, the lower graph would have averaged out to a straight line, displaced either above or below the first graph according to the average drift in the tape position with respect to the detector. The second important conclusion is that despite the fact that the tape has been displaced vertically, the dynamic transversal tape movements are basically undisturbed. This is evident from the strong correlation seen between the two waveforms in FIG. 1. This proves the essential point of the invention mentioned earlier: The physical mechanisms of the characteristic waveforms stemming from the rotating parts of the cartridge and the motor causing the dynamic transversal tape vibrations are not directly coupled to the physical mechanisms causing the sliding of the tape in its guides. Another way of expressing this is to say that the mechanisms are orthogonal. Therefore, they can be processed with two different algorithms, each controlling the movement of the magnetic recording head to compensate for the both the correlated vibrations and the random abrupt or slow tape drift.

Figure 2:
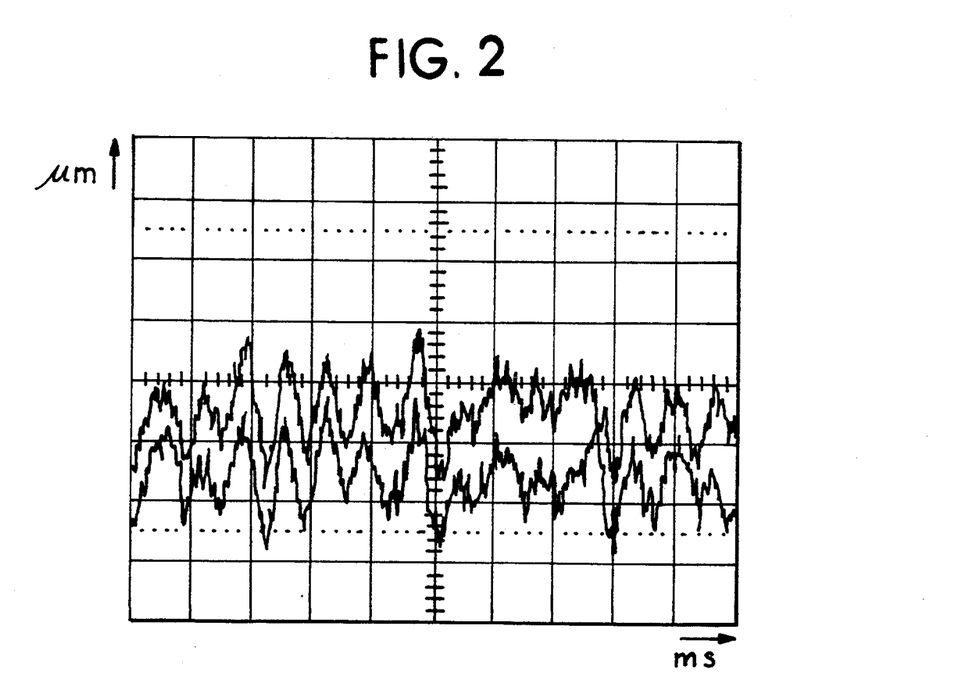

FIG. 2 shows, in a time scale of 50 ms/div. but with the same tape speed, singleshots of the first and 1000th waveform recorded. The correlation is surprisingly strong.

Figure 3:
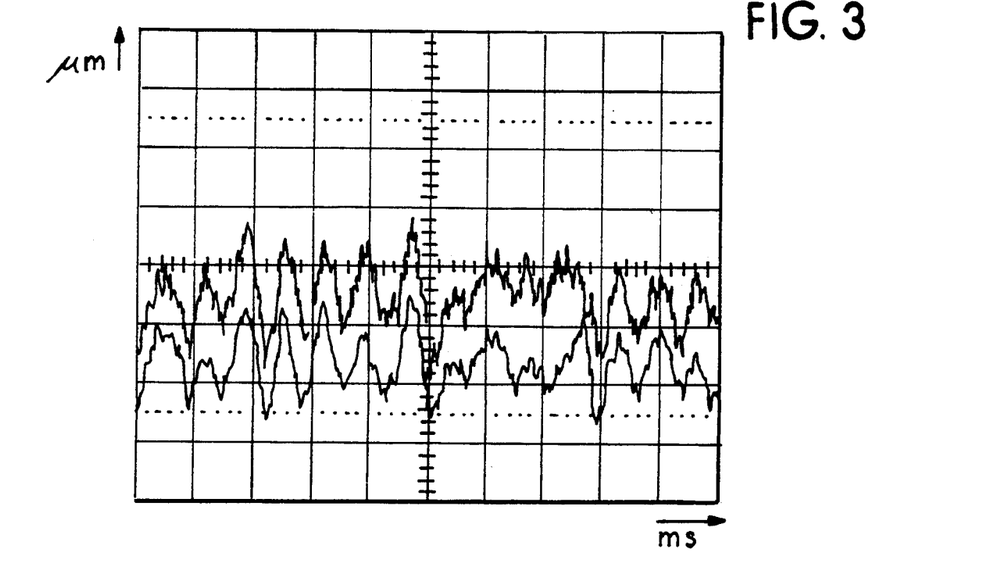

FIG. 3 is from the same experiment as in FIG. 2. The upper graph is the first waveform and the lower graph is the average waveform. Even small details from the first waveform can be seen in the waveform representing the average vibrations.

The physical key to this observation is now clearly seen. The ¼ inch cartridge belt directly couples the tape, the tape hubs, the belt rollers, the drive wheel, the cartridge capstan, the motor shaft and the rotor of the motor to each other. It is a stable and strongly coupled, precision system, as long as the cartridge capstan does not slide on the drive wheel and as long as the belt does not slide relative to the tape loaded on the hubs or slip on the rollers or on the cartridge capstan. In a ¼ inch tape streamer the capstan motor servo carefully ramps up the tape speed along a linear ramp so that the coupling is maintained. When the tape is stopped, the coupling is also preserved by using the internal friction forces in the cartridge or by a ramp-down servo-controlled braking operation of the motor. As long as the cartridge is not removed from the capstan wheel, the coupling is maintained. In a well-designed tape drive, the dominating component of the transverse tape movement will stem from the rotating parts of the cartridge itself. The inventor's measurements have confirmed this phenomenon.

Therefore, the dominating dynamic transversal vibrations of the tape, as shown in the figures, can be thought of as one single, cartridge/drive-unique space-domain waveform which translates to one corresponding time domain waveform, scaled between the two domains with the tape speed. The cartridge can be removed from the tape drive and the same characteristic waveform will be measured if the cartridge is re-inserted in the drive and driven again.

DESCRIPTION OF THE DRAWINGS

As noted above.

DESCRIPTION OF THE PREFERRED EMBODIMENTS

As discussed above the inventor has recently discovered that the dynamic Transversal Tape Movements (TTM) are not random with respect to the longitudinal position of the running tape when the cartridge is locked in-place and the cartridge capstan engages the drive wheel, and also when the cartridge is removed from its drive. This observation can be summarized by the conclusion that the cartridge itself has its own characteristic "signature" for the transversal tape movements. This signature is stored in memory positions corresponding to sampled tape positions. Since the servo tracks are recorded outside the cartridge, the servo tracks will also move relative to the head as the tape does.

In a method for improving the accuracy of known tape seek algorithms, based on the above observation and intended for tapes with servo formats, a small part of the TTM, at the Beginning Of Tape (BOT) and at the End Of Tape (EOT) are initially recorded and loaded into a memory as a separate operation when the cartridge is inserted into the tape drive. The amount of information stored corresponds to the maximum tape length estimated to be used before the servo can be locked. During the track seek and track count algorithm the servo system is not locked. During this operation, the TTM information is superimposed on the position command (obtained using the algorithm) to the magnetic recording head. This will reduce the risk of miscounting of tracks which could be fatal for the file protect of data during write operations.

This method and a corresponding apparatus, are used to improve the reliability of the servo track seek algorithm for high track density tape formats, e.g., for both dedicated, buried servo formats and for other types of servo formats (e.g., tape edge sensing systems) in which the magnetic head is moved by a linear actuator or by a stepper motor. The stepper motor and the linear actuator (or the linear actuator only if it can operate over the entire range of the servo bands (a linear actuator range of approximately 0.5 mm being sufficient for the 10 GByte tape drive)) can perform the function of super-positioning a linear ramp and the memory-recalled TTM if they are able to follow those fast dynamic movements of the tape. This means that the mechanical design must be capable of operating in an open loop mode at fairly high frequencies. The mechanical system, therefore, must be free of self-resonance frequencies falling in the frequency range of the TTM. Suitable mechanical actuators are the subject of certain co-pending applications of the assignee, identified below. If only a linear actuator is used, the position command will consist of a linear, analog ramp current to which the recalled TTM position is added. This addition can be performed either prior to or after the digital-to-analog conversion.

In accordance with the method, each time the tape is started from BOT or from EOT a tape longitudinal position marker signal triggers the analog-to-digital sampling of the tape's transversal movement (TTM) and a signal processor stores the samples in a memory. This procedure can be repeated to improve the accuracy by averaging the measurement vectors from pass to pass. For example, three short passes can be made both at the BOT position and at the EOT position to give a very good estimate of the TTM at those positions. During these measurement operations the track servo system may either be in a non-locked state or in a locked state, depending on the dynamic range of the servo pattern available and the width of the read gaps used to measure the dynamic movements of the tape. In the latter case, the servo error signal and the knowledge of the open-loop servo gain must be used to calculate the actual deviation, whereas for the first case the deviation can be used directly.

The information stored in the memory is subsequently used each time a wind or rewind operation is initiated from BOT or EOT, i.e., during the servo track seeking periods when the servo is not locked and the tracks are counted by the digital servo processor. Even if the servo is partially locked during the track seek and track count operation, as part of known algorithms used to move the servo head perpendicularly to the servo tracks, the superposition of a linear ramp and the recalled TTM can be used as a basis for the servo position command. The method disclosed herein thus provides an improvement in all types of algorithms used to count the servo tracks in belt driven cartridges, i.e., ¼ inch data cartridges.

Figure 4:
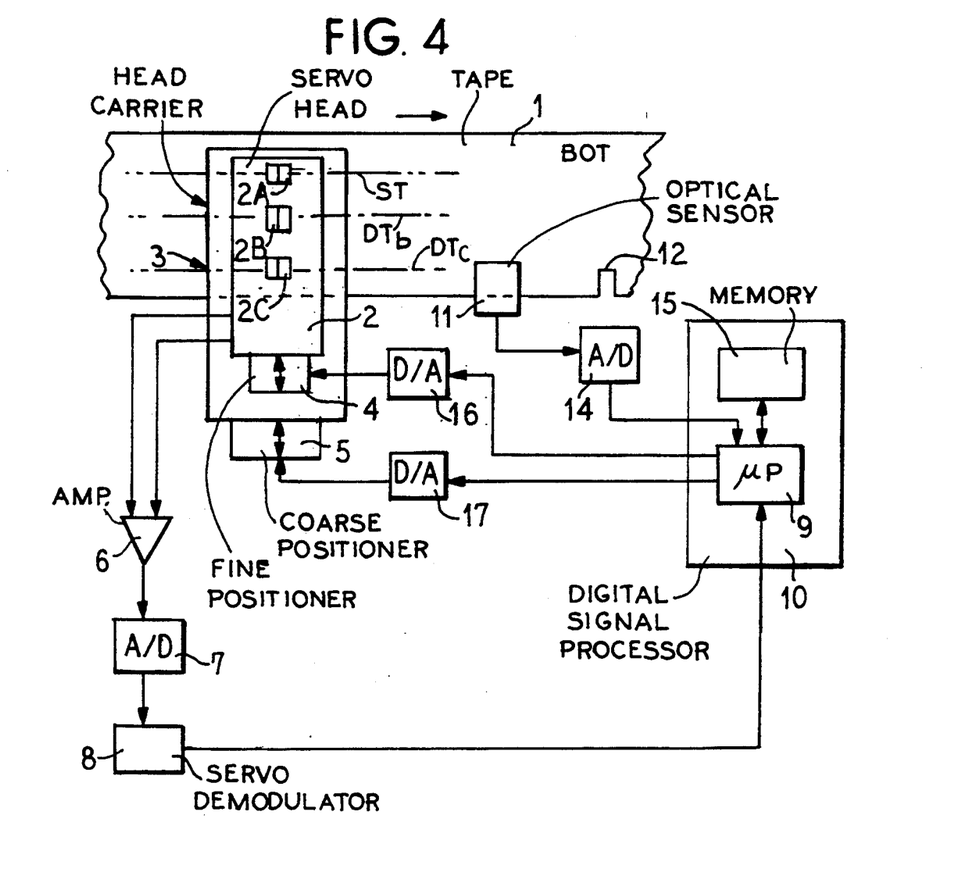
FIG. 4 is a schematic block diagram of an apparatus for improving the accuracy of a track seek algorithm, constructed in accordance with the principles of the present invention and operating according to the method disclosed herein.

An exemplary apparatus operating in accordance with the above method is shown in FIG. 4, and functions as follows. A combined head 2 is positionable over a tape 1 having a plurality of data tracks (two of which being schematically indicated as $DT_b$ and $DT_c$) and a plurality of servo tracks (one of which is schematically indicated at ST) thereon. The combined head 2 is mounted on a head carrier 3 and is movable in a direction perpendicular to the direction of tape travel (tape travel being, in the exemplary embodiment of FIG. 4, from left to right, as indicated by the arrow on the tape 1).

The combined head 2 is used to assist in positioning a write/read head relative to a data track. One or more write/read heads may be contained with a servo head in the combined head 2, as shown in the example of FIG. 4, wherein the combined head 2 includes a servo read head 2A following the servo track ST, for use in positioning write/read heads 2B and 2C relative to data tracks $DT_b$ and $DT_c$, respectively. Adjustment of the position of the write/read head 2 perpendicular to the direction of tape travel is undertaken by a fine positioner 4 and a coarse positioner 5. The coarse positioner 5, for example, may move the entire head carrier 3, in order to grossly position the combined head 2 relative to a desired track, and the fine positioner 4 then precisely adjusts the position of the combined head 2 on the carrier 3 relative to the desired track. The structure for accomplishing such coarse/fine adjustment of the combined head 2 may be as described, for example, in co-pending application Ser. No. 07/815,167, filed Dec. 31, 1991, entitled "Magnetic Head Stepping Servo System for a Tape Drive Unit," or as described in co-pending application Ser. No. 07/836,955, filed Feb. 19, 1992, entitled "Method and Apparatus for Positioning a Magnetic Head," both of which are assigned to the assignee herein, Tandberg Data A/S.

As is known, while the tape 1 is moving, the servo head can obtain signals from a servo track, such as the track ST, for use as a reference in maintaining a known positional relationship between the combined head 2 and the tape 1, so that when the write/read head is required to move from one data track to another, either to write information thereon or read information therefrom, the write/read head can be accurately positioned relative to the desired data track, such as track DT. As noted above, this is accomplished by one of many known track counting/track positioning algorithms. For this purpose, the analog electrical signals generated by the combined head 2, upon reading the information contained in the servo track ST, are supplied to an amplifier 6, are converted into digital form in an analog-to-digital converter 7, and are supplied to a servo demodulator 8, operating in a known manner. The output of the servo demodulator 8 is supplied to a microprocessor 9, contained in a digital signal processor 10, for use as described below. The signal supplied to the microprocessor 9 from the servo demodulator 8 is thus obtained in a conventional manner, using whichever of the known track seek algorithms is determined to be most appropriate under the circumstances.

The apparatus also includes an optical sensor 11, on which light from a light source (not shown) disposed on an opposite side of the tape 1 is incident. The optical sensor 11 must be located as close as possible to a line extending through the read heads 2A, 2B and 2C so that the positions of the optical sensor 11 and these read heads can be considered as being the same. The relative positions of those components shown in FIG. 4 are therefore not intended to show actual positions. In accordance with the invention, the tape 1 is provided with some type of deformation, such as a notch 12 or a small auxiliary hole punched near the tape edge, which provides a relatively large signal spike at the output of the optical sensor 11, for use as a marker in the signal. In the exemplary embodiment of FIG. 4, the notch 12 is shown at BOT, however, it will be understood that a similar notch will be provided at EOT as well. The analog output of the optical sensor 11 is converted into digital form in an analog-to-digital converter 14, and a waveform, characteristic of the TTM for the combined cartridge/drive system, of the type shown in FIGS. 1, 2 and 3, is stored in a memory 15, contained in the digital signal processor 10. (The signal from the converter 14 is actually supplied to the microprocessor 9, and it will be understood that the digital signal processor 10 includes an internal data bus for cover routing the signal to the memory 15.) The microprocessor 9 superimposes the stored TTM signal recalled from the memory 15, and a linear ramp signal recalled from a table in the memory 15 when generating control signals for the fine positioner 4 and the coarse positioner 5. These control signals, emitted by the microprocessor 9 in digital form, are converted to analog control signals in respective digital-to-analog converters 16 and 17.

Figure 5:
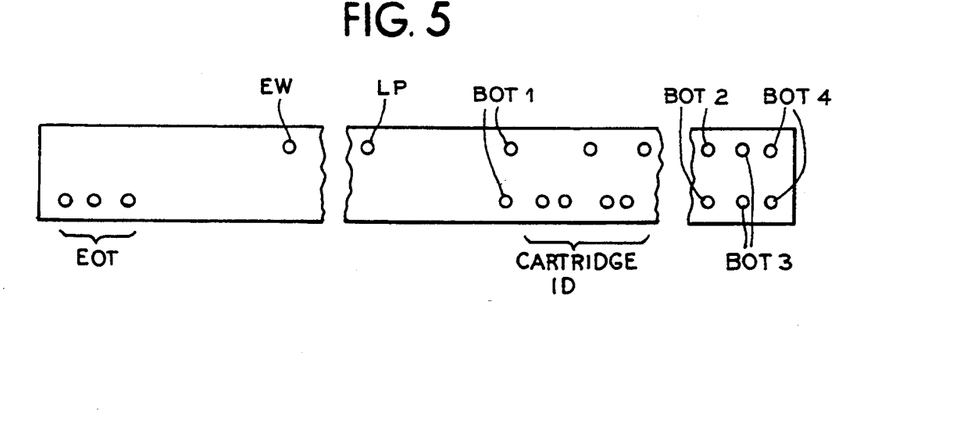
FIG. 5 is a schematic representation of the hole arrangement in a tape of the type used in a further embodiment of the invention.
Figure 6:
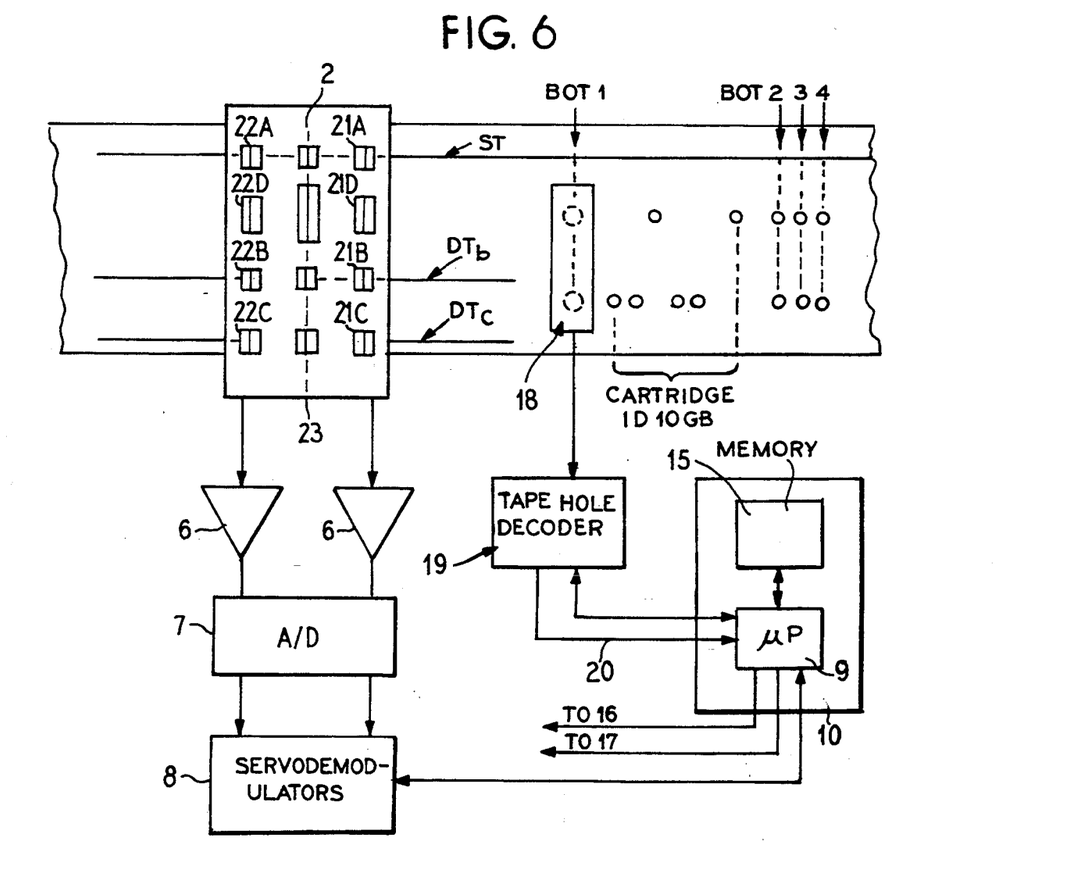
FIGS. 6 and 7 are respective schematic block diagrams of portions of further embodiments of an apparatus constructed in accordance with the principles of the present invention and operating according to the method disclosed herein.
Figure 7:
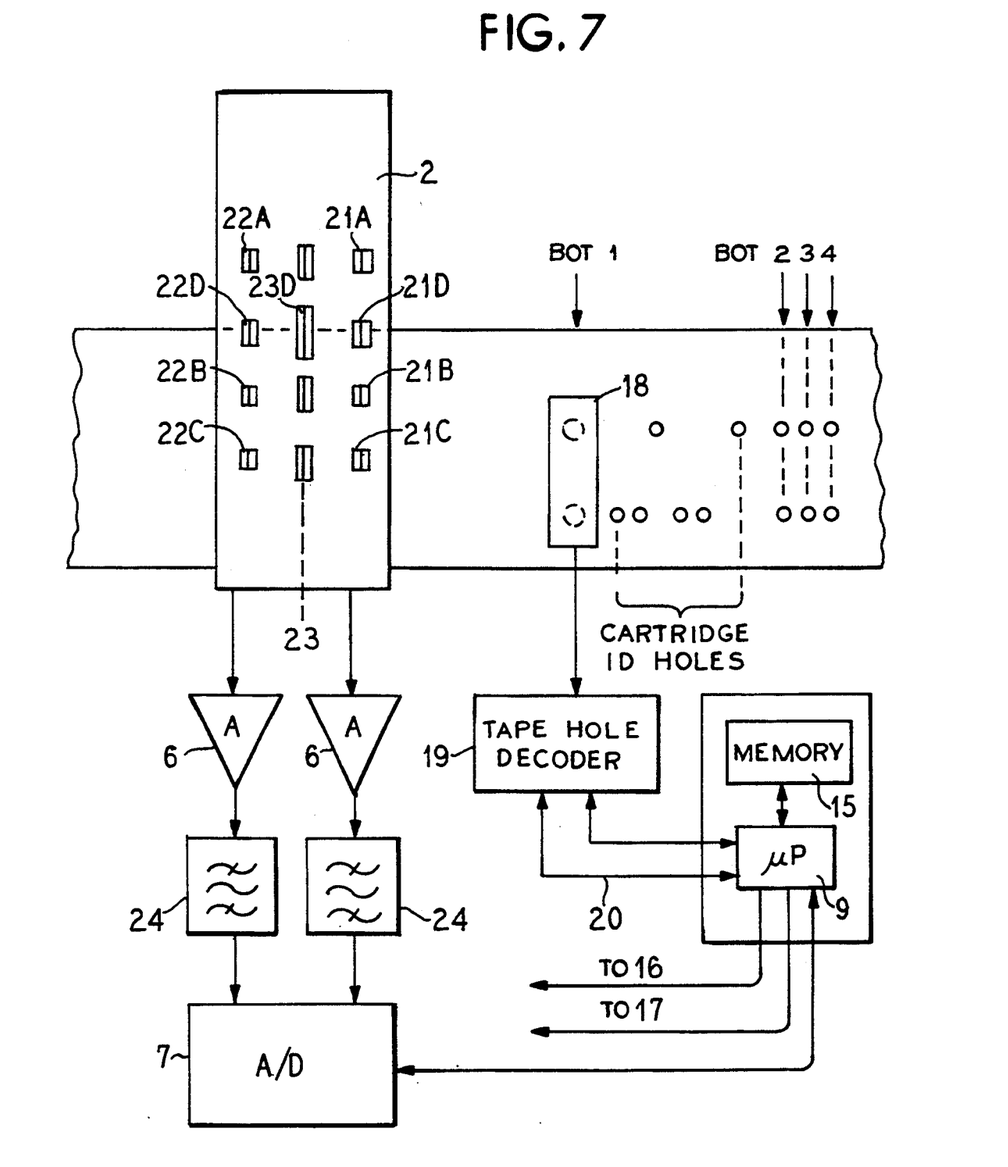

The preferred embodiments of the invention are shown in FIGS. 6 and 7 and employ a tape hole detector instead of the optical sensor 11, and are used with a tape having holes in a pre-formatted, specified arrangement, as an example of which the hole format for a 10 GByte tape cartridge according to QIC Standard 139 is shown in FIG. 5. The portions of the respective embodiments shown in FIGS. 6 and 7 represent only those components which constitute a departure from the overall apparatus shown in FIG. 4, and it will be understood that the remaining components of FIG. 4 will be present in the other embodiments.

The embodiments of FIGS. 6 and 7 show a 10 GByte servo format with sets of read heads 21A and 22A, 21B and 22B, 21C and 22C, and 21D and 22D for forward and backward reading. The embodiments also include write heads 23A, 23B, 23C and 23D, disposed at the gap line 23. The TTM is assumed to be the same at the forward and backward read positions on the opposite sides of the gap line 23.

In one of the preferred embodiments, shown in FIG. 6, an optical tape hole detector 18 (which will already be present in the drive) is used to provide signals which will correlate the TTM with the longitudinal position of the tape. (Unlike the optical sensor 11, the detector 18 need not be positioned as close to the read heads as possible, and the position of the detector 18 will be determined by the position of the mirror (not shown) which is standard in data cartridges.) The tape hole decoder 19 is programmed (as is known) from the microprocessor 9 depending on the cartridge ID which is present in the form of a hole pattern on the tape. When a cartridge is inserted in a drive, the tape hole detector detects the cartridge ID, which is supplied to the microprocessor 9, which then programs the decoder 19 to "look for" the EOT and BOT patterns associated with the type of cartridge which is now known to be in the drive.

A synchronizing signal is provided from the tape hole decoder 19 to the microprocessor 9 via line 20, which is also used to provide a signal indicating when the stored data is to be recalled from the memory 15. The synchronizing signal can be obtained by counting or otherwise decoding the tape identification holes contained in the BOT area, or simply by keeping track of the BOT or EOT holes. A data capture start signal is generated when the last BOT or the last EOT (at the opposite tape end) occur. It is also possible to delay the actual servo track seek operation with respect to the synchronizing signal and the tape holes. An inherent delay will occur at BOT since the tape hole detector is located at the other end of the tape cartridge (where the cartridge mirror is located) downstream from the combined head 2. If the tape is moving in the other direction, a certain time will be required, after the last EOT hole pair has passed the tape hole detector 18, for the holes to reach the combined head 2. In some tape formats, the tape holes are cut through the servo tracks, and thus the digital processor should preferably introduce a delay after the last EOT hole before the start of data capture. For the purpose of the invention, however, it is not important where the capture of servo data starts nor how long it lasts. The only requirement is that the capture must start at the same tape position each time, and must last for a duration necessary for a worst-case servo track seek operation. The servo track seek is normally finished before the load point LP or the early warning EW (see FIG. 5) is reached.

Another of the preferred embodiments is shown in FIG. 7, wherein read heads and an auxiliary track is in a first pass written by a write head 23D in an "empty" region at the tape edge. In a next pass, read heads 21D and 22D are positioned nominally over the tape edge, and read the signal written by the write head 23D, which will be modulated by the TTM. This "next pass" may be with the tape travelling backward; the TTM waveform must then be recalled time-reversed. The read heads 21D and 22D are part of the backward compatible channel which is present in conventional drives. The TTM-modulated signals read by heads 21D and 22D pass through amplifiers 6 and through a read channel bandpass filters 24 wherein demodulation is performed by conventional peak detection to obtain an analog TTM signal (waveform). The peak-detected signals are supplied to analog-to-digital converters 7 and thereafter to the microprocessor 9, which transfers the data to the memory 15.

It will be understood that components such as the optical sensor 11, the tape hole decoder 19, the microprocessor 9 and the combined head 2 are used for other purposes in the normal, conventional operation of the drive, and the connections necessary for these functions, unrelated to the subject matter of the invention, such as connections needed for data processing, are omitted for clarity. Also, it will be understood that only signal lines are shown in the drawings, and lines for power supply to certain of the components will be present, but are also omitted for clarity.

A typical operational cycle of the apparatus, using the embodiment of FIG. 4 as an example, is as follows.

When the tape 1 is positioned by BOT or EOT (BOT in the example of FIG. 4), prior to the tape speed ramp-up, the combined head 2 is positioned just below the servo track ST, as shown (exaggerated) in FIG. 4, so that no servo signals can be obtained. The tape 1 is ramped-up to normal speed and a synchronizing signal derived from the notch 12 is generated by the optical sensor 11 and is supplied from the analog-to-digital converter 14 to the microprocessor 9. The memory 15 is then enabled by a signal from the microprocessor 9 to receive the signals from the analog-to-digital converter 14 corresponding to the waveforms as shown in FIGS. 1, 2 and 3, at which time the microprocessor 9 may be disenabled from receiving the output of the analog-to-digital converter 14. When a ramping operation is to end, the microprocessor 9 reaches a state, after a predetermined time of sufficient length for the TTM waveform, at which it stops the entry of TTM data into the memory 15. The microprocessor 9 is again able to receive the output from the converter 14 if a new pass is to be undertaken to generate another sample of TTM data in the memory 15. When two or more TTM samples have been loaded into the memory 15, the digital signal processor 10 can perform an averaging operation on the TTM data. Further, the static average value (a single number) of the TTM waveform must be subtracted from all the components of the average TTM waveform. The result of this averaging is the final TTM, which is stored in the memory 15 and will be used during the servo track count and seek procedure. The "raw" TTM sample waveforms can then be deleted from the memory 15.

When the microprocessor 9 receives the ramping trigger (start) signal, it begins a transversal ramp by a command to the coarse positioner 5. At the same time (or time-multiplexed in a sub-microsecond time scale), another command signal is supplied to the fine positioner 4 by reading the stored TTM signal (characteristic for this part of the tape 1) from the memory 15 and converting that signal to analog form in the digital-to-analog converter 16. The total movement executed by the combined head 2 is thus a superposition (sum) of the ramp signal and the TTM signal. Since the actual TTM during this seek procedure is very strongly correlated to the recalled TTM, the servo track or tracks as seen by the combined head 2 will be scanned with a linear ramp. This is a significant improvement because the servo system is not normally locked-in during this seek procedure. Eliminating the major part of the TTM as seen by the combined head 2 during the seek operation thereby results in a significant improvement in the accuracy and reliability of the track seek algorithm which is subsequently employed. The position of the servo track now having been located with increased accuracy, the known track seek and count algorithm can then be implemented in a conventional manner, but with increased accuracy, speed and reliability.

Additionally, the aforementioned observations relating to TTM show that the characteristic TTM waveform is not disturbed by abrupt tape displacements, which may arise even without stopping the operation of the coarse positioner 5. In fact, the use of the recalled TTM waveform will greatly reduce the apparent effect of such abrupt changes, so that the reliability of the servo count procedure is improved.

Thus, regardless of the type of track seek algorithm and track counting method which are employed, the recalled TTM waveform is superimposed on one or more of the actuators which are used to move the combined head 2. If only one actuator were used, the recalled TTM waveform could be used to "wiggle" the movement of this actuator so that the combined head 2 would still not "see" the major part of the actual TTM, which correlates with the recalled TTM.

An example of a system which can be improved with the method and apparatus disclosed herein is the QIC 10 GByte tape format with dedicated servo, shown in FIGS. 6 and 7. With this servo system it is rather difficult to implement an ultra-reliable servo track counting algorithm due to the dynamic tape movements. There is a certain but very small risk of losing the track count on every track seek operation. However, when millions of operations are performed, as will be the case on a large population of tape drives, the accumulated probability of failure will increase.

For this known servo format, the normal low-noise operating range for the servo is about 70% of the operating range of the read gaps. The read gap operating range is approximately $\pm 19$ $\mu$m, and therefore the low-noise operating range is approximately $\pm 13.3$ $\mu$m. If averaging is used to cancel noise, the low-noise operating range can be extended to approximately 90% of the operating range of the read gaps, or $\pm 17.1$ $\mu$m. In most cases, however, $\pm 17.1$ $\mu$m would be sufficient for the 10 GByte format. If the firmware should detect that the servo head is not centered, it can simply displace the head slightly on the next pass. Averaging data from several passes with a displaced head position will still yield a good result, but data will have to be discarded which is outside the linear range, and then an extra pass will have to be made with the head displaced in the correct direction.

The method can also be used with the so-called "backward compatible channel" which is normally available in a combined head of the type shown in FIGS. 6 and 7. The QIC 10 GByte tape drives, for example, must be backward compatible with tape formats without servo tracks. The combined head 2 shown in FIGS. 6 and 7 includes a full backward compatible write channel shown on the gap line 23, with a write gap about 178 $\mu$m in width. The read gap is 76 $\mu$m. The write gap of this backward channel is positioned so that a track is first written at the edge of the tape with a low-frequency waveform. This is normally a "forbidden" low-tension tape area, but it is known to use this area for tape edge seeking purposes. For the 10 GByte tape format, the width of the area to be used for edge writing is about 250 $\mu$m, of which a maximum of perhaps 150 $\mu$m could be used for writing. It is assumed that accurate calculations will be done so that there is no risk of writing over data which may be on the tape prior to the TTM recording procedure. The head is nominally positioned so that a worst-case TTM will not cause the write gap edge to be inside the tape edge, i.e., the outer edge of the write gap must always cover a tape area during writing. This can be performed by letting 80% of the write gap width to be within the average tape edge position. The write gap positioning takes place shortly before the generation of synchronizing signal, and the write operation continues for the required length of tape. The TTM is found at the tape position where the servo track algorithm shall start.

For measuring the characteristic TTM, the two lower 10 GByte read gaps, or preferably the two read gaps for the backward compatible channel, are positioned with their center line on the tape edge prior to encountering the synchronization point. This can be accomplished with a conventional track seek algorithm, of the type used in drives manufactured by the assignee of the present application. Such an algorithm, however, cannot place the read gap precisely 50% on the tape edge just prior to the synchronizing signal, however, it can be placed within 20% to 70% of the gap width due to the TTM. As shown in FIG. 1, if the averaging starts at the same longitudinal position, any offset from this ideal 50% position will not disturb the averaging process, i.e., the TTM in this context is defined by excluding the arithmetic mean of the result of the averaging operation. The physical cause for doing so is that there is no control of the mean value, because the read gap cannot be initially positioned precisely correctly without a servo system, and because of the slow tape drift from pass to pass. The averaging operation and computation of the TTM is typically performed by at least three passes. If sudden, abrupt changes in the TTM should occur, or if external noise is present, this can easily be detected by additionally computing the peak deviation from the resulting TTM. In this case, more than three passes can be performed to improve the TTM estimate.

The hardware cost for the implementation of this invention is very low. The cost for the synchronizing signal is, for example obtained with digital logic hardware processing from the tape hole detector signals, is very low since it can be easily integrated with the existing tape hole decoder. All other components already exist in the servo system, except for a small extra increase in memory requirement to store the TTM and to hold the procedures for storing and recalling the TTM signals.

Although modifications and changes may be suggested by those skilled in the art, it is the intention of the inventor to embody within the patent warranted hereon all changes and modifications as reasonably and properly come within the scope of his contribution to the art.

I claim:

1. A method for positioning a magnetic servo head relative to a servo track on a traveling magnetic tape, comprising the steps of:
   monitoring transverse movements uniquely exhibited by a traveling tape in a drive unit to obtain a waveform, longitudinally correlated with said tape, which is uniquely characteristic of said transverse movements of said tape;
   storing said waveform;
   controlling positioning of a servo head relative to a servo track on said tape using a control signal; and
   recalling the stored waveform and superimposing said waveform on said control signal for positioning said servo head relative to said servo track on said tape.

2. A method as claimed in claim 1 wherein the step of monitoring transverse movements of a traveling tape in a drive unit is further defined by the steps of:
   directing light toward one side of said tape;
   monitoring variations, at an opposite side of said tape, of the amount of said light blocked by said tape due to said transverse movements of said tape;
   generating an electrical signal corresponding to said variations.

3. A method as claimed in claim 2 wherein the step of monitoring variations is further defined by monitoring variations in the amount of said light blocked by an edge of said tape.

4. A method as claimed in claim 2 wherein the step of monitoring transverse movements of said tape includes the additional steps of:
   providing a mark on said tape which generates a distinctive variation in the amount of said light which is blocked by said tape;
   using said distinctive variation as a reference point for starting the monitoring of said transverse movements of said tape;
   monitoring transverse movements of said tape a plurality of times over identical tape distances following said distinctive variation to obtain a plurality of said electrical signals corresponding to said variations; and
   averaging said variations to obtain said waveform.

5. A method as claimed in claim 1 wherein the step of monitoring transverse movements of a traveling tape in a drive unit is further defined by optically monitoring transverse tape movements of a traveling tape in a drive unit to obtain a waveform which is characteristic of said transverse movements.

6. A method for positioning a magnetic servo head relative to a servo track on a travelling magnetic tape in a system also having a tape hole detector for detecting hole patterns in said tape, said method comprising the steps of:
   obtaining a synchronization signal from said tape hole detector upon the identification by said tape hole detector of a hole pattern in said travelling tape in a drive unit;
   monitoring transverse movements uniquely exhibited by said travelling tape in said drive unit for a selected time following said synchronization signal to obtain a waveform which is uniquely characteristic of said transverse movements of said tape;
   storing said waveform;
   controlling positioning of a servo head relative to a servo track on said tape using a control signal; and
   recalling the stored waveform and superimposing said waveform on said control signal for positioning said servo head relative to said servo track on said tape.

7. A method for positioning a magnetic servo head relative to a servo track on a travelling magnetic tape in a system also having write and at least one read head, said method comprising the steps of:
   writing a signal on said travelling tape in an empty region at an edge of said tape in a first pass of said tape, said travelling tape exhibiting transverse movements causing said signal to be transverse movement-modulated;
   reading said transverse movement-modulated signal with said read head in a subsequent pass of said travelling tape to obtain a transverse movement-modulated read signal;
   demodulating said transverse movement-modulated read signal to obtain a waveform which is uniquely characteristic of said transverse movements of said tape;
   storing said waveform;
   controlling positioning of a servo head relative to a servo track on said tape using a control signal; and
   recalling the stored waveform and superimposing said waveform on said control signal for positioning said servo head relative to said servo track on said tape.

8. A method as claimed in claim 7 wherein the step of demodulating said transverse movement-modulated read signal is further defined by demodulating said transverse movement-modulated read signal by peak detection.

9. An apparatus for positioning a magnetic servo head relative to a servo track on a traveling magnetic tape, comprising:
   means for monitoring transverse movements uniquely exhibited by a traveling tape in a drive unit for obtaining a waveform, longitudinally correlated with said tape, which is uniquely characteristic of said transverse movements of said tape;
   means for storing said waveform;
   means for controlling positioning of a servo head relative to a servo track on said tape by generating a control signal; and
   means for recalling said stored waveform and for superimposing said waveform on said control signal for positioning said servo head relative to said servo track on said tape.

10. An apparatus for positioning a magnetic servo head as claimed in claim 9 wherein said means for monitoring transverse movements of a traveling tape in a drive unit comprises means for optically monitoring transverse movements of a traveling tape in a drive unit for obtaining said waveform which is uniquely characteristic of said transverse movements.

* * * * *